United States Patent [19]
Woog

[11] Patent Number: 5,401,005
[45] Date of Patent: Mar. 28, 1995

[54] SILVER RECOVERY CELL

[76] Inventor: Gunter Woog, 5435 Bauers Dr., West Bend, Wis. 53095

[21] Appl. No.: 225,654

[22] Filed: Apr. 11, 1994

[51] Int. Cl.⁶ .............................................. C22B 11/00
[52] U.S. Cl. .................................................... 266/100
[58] Field of Search .......................................... 266/170

[56] References Cited

U.S. PATENT DOCUMENTS

| | | | |
|---|---|---|---|
| 2,643,108 | 6/1953 | Lieberman | 266/170 |
| 3,744,995 | 7/1973 | Mackay | 266/170 |
| 4,331,473 | 5/1982 | King | 266/170 |
| 5,173,247 | 12/1992 | Woog | 266/170 |

*Primary Examiner*—Peter D. Rosenberg
*Attorney, Agent, or Firm*—Ryan, Kees & Hohenfeldt

[57] ABSTRACT

An improved cell for removal of silver ions from a liquid such as used photographic fixer includes a container having enclosed side and bottom walls. Fluid flow inlets and outlets for the flow of a liquid into and out of said cell are provided at opposite ends of the container. A layer of iron-containing material is positioned between the inlet and the outlet, and a layer of pellets, preferably spherical, having a density greater than water, is positioned above the layer of iron-containing material so that the iron-containing material is continuously compressed by the weight of the pellets, thereby avoiding formation of voids in the material as it is consumed.

10 Claims, 1 Drawing Sheet

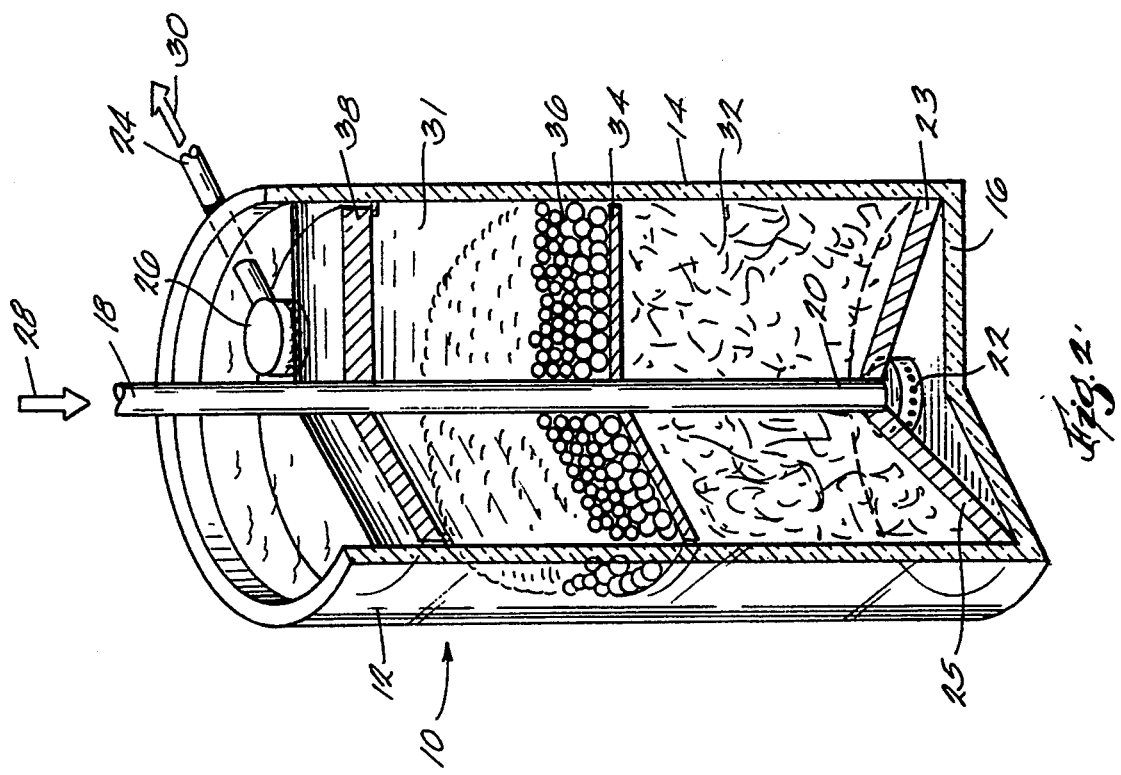
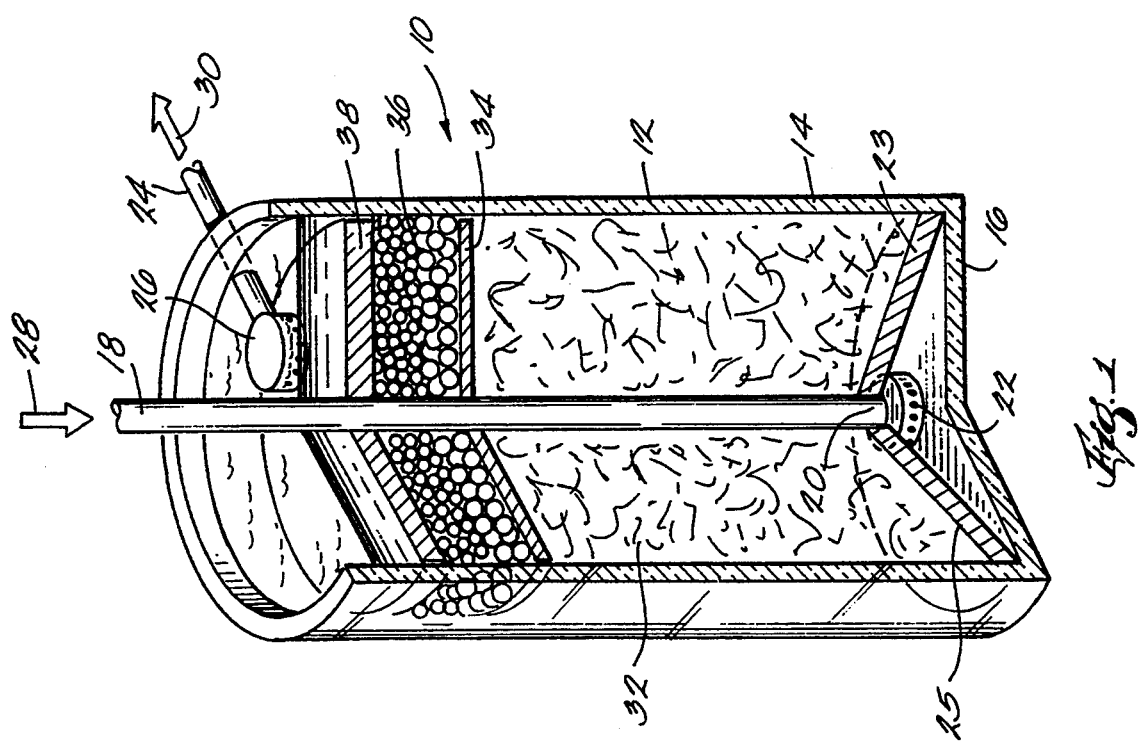

SILVER RECOVERY CELL

FIELD OF THE INVENTION

This invention relates to apparatus for removal and recovery of silver from chemical solutions, especially used photographic fixers.

BACKGROUND OF THE INVENTION

Because of the toxic nature of silver solutions as a pollutant in sewage treatment facilities and because of the value of recovered silver as a byproduct, significant attention has been directed at methods and devices for removal of silver from solutions such as photographic fixers. In my U.S. Pat. No. 5,173,247, issued Dec. 22, 1992, I described one such device wherein various plastic chips or packing material were utilized to support scrap metal parts in the flow path in a container between the inlet and outlet of the container. Other devices are shown, for example, in U.S. Pat. Nos. 3,857,703; 4,331,473; 3,692,291 and 3,630,505.

A need has continued to exist for improved iron ion-providing devices for recovery of silver from solution.

SUMMARY OF THE INVENTION

The present invention provides a silver recovery cell in which readily available, inexpensive materials are utilized. In accordance with one aspect of the invention, iron-containing materials such as chopped steel fragments or steel wool are utilized either with or without an inert filler.

In order to overcome a problem of cavitation or channeling, which sometimes occurs as the iron-containing materials are consumed by ion exchange, in accordance with an important aspect of the invention, the iron-containing material is continuously compacted during use. More specifically, a cell is provided in which metal fibers or fragments are provided in the flow path of a chamber between its inlet and outlet and this layer is weighted by means of a free-flowing particulate material, preferably pellets having a rounded or spherical shape, that continuously press down on the iron-containing materials under the force of gravity to keep the same compacted even as they are consumed.

Briefly summarized, the invention provides an improved cell for removal of silver ions from a liquid such as used photographic fixer which includes a container having enclosed side and bottom walls. Fluid flow inlets and outlets for the flow of a liquid into and out of said cell are provided at opposite ends of the container. A layer of iron-containing material is positioned between the inlet and the outlet, and a layer of pellets, preferably spherical, having a density greater than water, is positioned above the layer of iron-containing material so that the iron-containing material is continuously compressed by the weight of the pellets, thereby avoiding formation of voids or channeling in the material as it is consumed. Such channeling is undesirable because it allows the flow of liquids to bypass the media.

BRIEF DESCRIPTION OF DRAWINGS

The invention will be further explained with reference to the following detailed description and accompanying drawings wherein:

FIG. 1 is a silver recovery device pursuant to the invention shown in a perspective view with parts in section for clarity; and FIG. 2 is a perspective view of the device of FIG. 1 showing the cell after portions of the iron-containing material of the cell have been consumed.

DETAILED DESCRIPTION

Referring more specifically to the drawings, there is shown a preferred apparatus constructed in accordance with the invention for recovering spent metals, particularly silver, from solution generally identified by numeral 10. Apparatus 10 includes an outer container 12 preferably having a cylindrical side wall 14 and a closed bottom 16, preferably flat.

An inlet 18 for receiving the inflow of liquids to be treated as shown, in accordance with the preferred embodiment the inlet 18 extends through the top of container 12 and has an outlet end 20 located near the bottom 16 of the container. A strainer device 22 is preferably positioned around the outlet end of the inflow tube 18. An outflow opening in the form of another tube extending through wall 14 is located near the top of the container. A strainer 26 is also preferably positioned around the outflow opening. Strainers 22 and 26 prevent solid materials such as the exchange medium 32 from clogging the inlet and outlet tubes. The flow of liquid into and out of the container is generally indicated by arrows 28 and 30.

A plurality of supporting transverse members 23 and 25 is preferably arranged around the bottom of the container to prevent plugging of strainer 22 by the exchange medium 32.

As seen in the drawings, the exchange medium 32 which contains iron ion providing materials such as chopped steel or iron fragments is located between the inlet opening and the outflow opening, so that the flow of liquids 28, 30 passes through the exchange medium. The liquid being treated is generally indicated by numeral 31.

Exchange medium 32 can, for example, be formed from chopped metallic particles having a maximum dimension of about 1/16 inch, preferably separated by inert filler materials such as fibers which keep the metal fragments separated and, thus, form a relatively homogeneous mixture. A preferred iron ion-containing material includes chopped steel wool fragments. The filler material may be in the form of plastic, glass, or organic fibers or particles such as sawdust. It has been found beneficial to use such materials which are porous in nature in order to provide space for accumulation of silver particles, which under some circumstances may cause an expansion of the medium as deposition occurs. It has been found suitable to utilize a filler material in a quantity amounting to approximately 50% by volume of the exchange medium 32.

Above the top of exchange medium 34 is a layer or baffle of fibrous material which enables separation of the solid materials but permits liquids to flow through relatively freely. Baffle 34 supports a layer 36 of pellets, preferably spherical in shape, which have a density greater than water. These pellets can be, for example, in the form of glass marbles or spherical ceramic shapes, steel pellets or balls, or even rocks of rounded configuration. In accordance with a preferred embodiment of the invention the layer of pellets closest to the medium 32 is of a light colored appearance in or to provide an indicator to allow visual monitoring of the condition of the cell during use. A second layer, which may be formed of inexpensive materials such as steel slugs or screened rocks may be positioned above the lowermost layer.

Baffle 34 and a top baffle 38 can be formed, for example, from a layer of fibrous polyester or other synthetic polymeric material.

The presence of the more dense material above the layer of iron-containing material continuously compresses the iron-containing ion exchange material 32 so that voids are not formed therein as it is consumed by the ion exchange process. As seen in FIG. 2, as the iron-materials compress, a layer of liquid 31 is found to exist above the layer of pellets 36 as they continue to press the medium 32 downwardly. In use, the liquid 31 flows as indicated by arrows 28 and 30, thus percolating upwardly through the interstices of the ion exchange material 32. Liquid 31 reacts with the exchange metal in medium 32, so that ferric ions replace the silver ions in solution. The silver precipitates as a sludge, which can be recovered from the container after it has been used. Containers 12 of approximately 0.5 to 8 gallons in size have been found suitable, although other size containers can be used, as desired. Often a series of three or more containers in series fluid flow communication have been found suitable. The walls of container 12 are preferably formed from an inert plastic material such a polyolefin, nylon or polyvinylchloride.

Preferably the cells of the present invention are used in a system wherein the flow of liquids is pumped and metered. It has been found that the silver content of treated liquids can be reduced to below 0.5 ppm. The cells have been found to provide a long media life, are compact, inexpensive and disposable.

While the apparatus hereinbefore described is effectively adapted to fulfill the aforesaid objects, it is to be understood that the invention is not intended to be limited to the specific preferred embodiment of silver recovery device set forth above. Rather, it is to be taken as including all reasonable equivalents to the subject matter of the appended claims.

What is claimed is:

1. An improved cell for removal of silver ions from a liquid comprising a container having enclosed side and bottom walls,
   a fluid flow inlet for the flow of a liquid into said cell,
   an outflow outlet for outflow of said liquid with inflow and outflow outlets positioned at opposite ends of said container,
   a layer of iron-containing material positioned between said inlet and said outlet, and,
   a layer of pellets positioned above said layer of iron-containing material said pellets having a density greater than water and being of a size such that a multiplicity thereof forms a layer within said container, whereby said iron-containing material is continuously compressed by the weight of said pellets.

2. A cell according to claim 1 wherein said container comprises a water resistant polymeric material.

3. A cell according to claim 1 wherein said fluid flow inlet extends through an open top of said container to the bottom thereof and said outflow outlet is positioned near the top of said container.

4. A cell according to claim 3 wherein said inlet and outlet are both provided with strainers.

5. A cell according to claim 1 wherein a transversely oriented supporting means is located above the inlet opening.

6. A cell according to claim 1 wherein said iron-containing material comprises chopped steel wool fibers.

7. A cell according to claim 6 wherein said iron-containing material includes an inert filler.

8. A cell according to claim 1 wherein said pellets comprise glass or metal spheres.

9. A cell according to claim 1 wherein said pellets are light colored, and said container is transparent so that visual observations of the cell can be made during use.

10. A cell according to claim 1 wherein a second layer of pellets is positioned above said light colored pellets.

* * * * *